United States Patent [19]

Offereins

[11] 3,824,386

[45] July 16, 1974

[54] APPARATUS FOR DETERMINING THE MOMENTARY TILT OF A VEHICLE OR CRAFT

[75] Inventor: Rienk Pieter Offereins, Wilmskamp, Netherlands

[73] Assignee: Hollandse Signaalapparaten B.V., Hengelo, Netherlands

[22] Filed: Apr. 26, 1973

[21] Appl. No.: 354,672

[30] Foreign Application Priority Data

May 4, 1972 Netherlands............................ 725986

[52] U.S. Cl......... 235/150.27, 73/178 R, 235/150.2, 235/150.25
[51] Int. Cl.................................................. G06g 7/78
[58] Field of Search........ 235/150.2, 150.25, 150.26, 235/150.27; 340/27 AT, 27 NA; 73/178 R, 505

[56] References Cited
UNITED STATES PATENTS

| | | | |
|---|---|---|---|
| 3,474,241 | 10/1969 | Kuipers...................... | 235/150.2 X |
| 3,483,746 | 12/1969 | Bers.............................. | 73/178 R |
| 3,597,598 | 8/1971 | McAllister et al............ | 235/150.25 |
| 3,757,093 | 9/1973 | Licata.......................... | 235/150.25 X |

Primary Examiner—Malcolm A. Morrison
Assistant Examiner—Jerry Smith
Attorney, Agent, or Firm—Frank R. Trifari

[57] ABSTRACT

An apparatus for determining the momentary tilt of a moving vehicle or craft is provided with two translational accelerometers mounted rigidly on or in the vehicle or craft. The output signals of the accelerometers determine the acceleration components ($a_x$, $a_y$) in two, mutually perpendicular, axial directions ($x$, $y$) situated in a plane horizontal with respect to the vehicle or craft. From said output signals the low frequency components of two of the three angles ($\alpha$, $\beta$) defining the momentary tilt are obtained by employing, amongst others, a low-pass filter available for the two signals. The low-frequency components of the third angle ($\gamma$) defining the momentary tilt are derived, via a low-pass filter, from a signal which is supplied by a compass and indicates the azimuth position of the vehicle or craft. The apparatus is furthermore provided with three angular accelerometers also mounted rigidly on or in the vehicle or craft, of which accelerometers the output signals determine the angular acceleration ($\omega$) which said vehicle or craft is experiencing with respect to its centre of gravity. From said output signals the high frequency components of the three angles ($\alpha$, $\beta$, $\gamma$) defining the momentary tilt are obtained by using a high-pass filter, available for each of these signals, and a (first) computing device.

5 Claims, 5 Drawing Figures

APPARATUS FOR DETERMINING THE MOMENTARY TILT OF A VEHICLE OR CRAFT

The present invention relates to an apparatus for determining the momentary tilt of a moving vehicle or craft. Such a tilt determination is of importance, for example, to the horizontal stabilisation of a platform which is in a cardanic suspension on the vehicle or craft or to an accurate determination of the direction of the course in which the vehicle or craft is moving.

The Dutch patent application 70.17134 describes a platform stabilisation system, in which a vertical gyro is kept in a position vertical with respect to the earth surface with the aid of two translational accelerometers mounted on the platform. The vertical gyro is in a cardanic suspension in a gyro housing mounted on the platform. The position of the vertical gyro forms a reference system with respect to which the platform is positioned, using a suitable servo system. It is an object of the present invention to determine a tilt position without employing a gyro functioning as reference system, while the result of the tilt position thus determined can be used directly for positioning a platform, in order to keep the latter in a horizontal position with respect to the earth surface.

The Dutch patent application 70.18173 describes a filter system for a course value determined by a compass, employing an azimuth gyro which is in a cardanic suspension in a gyro housing mounted on a stabilised platform; the signal supplied by the compass contains "cardan errors" due to the fact that, as the compass also being in a cardanic suspension is not on a horizontal platform, this compass must process the ship's movements fully within its cardanic system. The azimuth gyro therefore functions as a compass filter and from its position a very accurate value of the direction of the vehicle or the course of the craft is obtained. It is another object of the present invention to determine a tilt position without employing a gyro functioning as compass filter, while the direction of the vehicle or the course of the craft is obtained directly by the result of the tilt position thus determined.

In accordance with the invention, the apparatus is provided with two translational accelerometers mounted rigidly on or in the vehicle or craft, of which accelerometers the output signals determine the acceleration components in two, mutually perpendicular, axial directions situated in a plane horizontal with respect to the vehicle or craft, from which signals the low frequency components or two of the three angles defining the momentary tilt are obtained by employing, amongst others, a low-pass filter available for the two signals, while the low-frequency components of the third angle defining the momentary tilt are derived, via a low-pass filter, from a signal which is supplied by a compass and indicates the azimuth position of the vehicle or craft, which apparatus is furthermore provided with at least three accelerometers also mounted rigidly on or in the vehicle or craft, of which accelerometers the output signals determine the angular acceleration which said vehicle or craft is experiencing with respect to its centre of gravity, from which signals the high frequency components of the three angles defining the momentary tilt are obtained by using a high-pass filter, available for each of these signals, and a (first) computing device.

The motion of the vehicle or craft may be characterised by the translation resultant of the centre of gravity of the vehicle or craft and the rotation of a coordinate system $(x, y, z)$, whose origin lies in said centre of gravity, with respect to a reference coordinate system $(X, Y, Z)$ whose origin lies also in said centre of gravity. The coordinate system $(x, y, z)$ thus follows the rotation of the vehicle or craft about its centre of gravity. The $z$ axis of the latter coordinate system is so selected that this axis is perpendicular to the horizontal plane of the vehicle or craft, whereas the $Z$ axis of the reference system $(X, Y, Z)$ is normal to the earth surface.

The rotation of the coordinate system $(x, y, z)$ with respect to the system $(X, Y, Z)$ can be described with three independent angles. To this end there are various possibilities; for example, assuming that the two coordinate systems coincide, the system $(x, y, z)$ may be given a random position by successively rotating it through an angle about the $z$ axis, the $y$ axis and again about the $z$ axis. These are known as Euler angles. However, other angles are chosen here to describe the rotation; a random position of the coordinate system $(x, y, z)$ with respect to the coordinate system $(X, Y, Z)$ is obtained by, again assuming the case in which the two systems coincide, rotating the coordinate system $(x, y, z)$ through an angle $\alpha$ about the $x$ axis, an angle $\beta$ about the $y$ axis and an angle $\gamma$ about the $z$ axis. With this selection the angles $\alpha$ and $\beta$ can be interpreted as the tilt angles, with the aid of which a platform mounted on the vehicle or craft can be servo-controlled in order to keep this platform in a position horizontal with respect to the earth surface, and the angle $\gamma$ as the tilt angle indicating the direction of the vehicle or the course of the craft.

A point in the coordinate system $(X, Y, Z)$ is indicated by the position vector $\vec{R}$; in the coordinate system $(x, y, z)$ this point is indicated by the position vector $\vec{r} = A \cdot \vec{R}$, where $A$ is the transformation matrix of the coordinate system $(x, y, z)$ with respect to the coordinate system $(X, Y, Z)$. The acceleration of this point, measured in the coordinate system $(x, y, z)$ can now be expressed by:

$$\vec{a} = \vec{a}_o + A\vec{g} + \vec{\omega} \times \vec{r} - \vec{\omega} \times (\vec{\omega} \times \vec{r})$$

where $\vec{a}_o$ is the translational acceleration of the vehicle or craft, $\vec{g}$ the gravitational acceleration with respect to the coordinate system $(X, Y, Z)$ and $\vec{\omega}$ the angular velocity of the vehicle or craft, about its centre of gravity with respect to the coordinate system $(X, Y, Z)$. The last two terms in the above expression represent the tangential and centripetal accelerations respectively.

Since the $x$ and $y$ components of the second term in the above expression can be written as respectively $g \sin \beta$ and $g \sin \alpha \cos \beta$ for the selected angles $\alpha, \beta$ and $\gamma$, the following expression holds for the $x$ and $y$ acceleration components of the above-mentioned point:

$$a_x = a_{ox} + g \sin \beta - (\omega_y^2 + \omega_z^2)x + (\omega_x\omega_y + \dot{\omega}_z)y + (\omega_x\omega_z - \dot{\omega}_y)z$$

$$a_y = a_{oy} + g \sin \alpha \cos \beta + (\omega_x\omega_y - \dot{\omega}_z)x - (\omega_x^2 + \omega_z^2)y + (\omega_y\omega_z + \dot{\omega}_x)z$$

In accordance with the invention, the vehicle or craft carries two translational accelerometers. These are placed in such a way that they are sensitive only to accelerations in the $x$ and $y$ directions respectively. The signals delivered by these accelerometers therefore represent $a_x$ and $a_y$. Each of these signals can be considered to consist of two parts, viz. a part derived from the component to the gravitational force in the sensitivity direction, which part contains the complete information about the tilt angles $\alpha$ and $\beta$, and a part derived from the remaining acceleration components in the sensitivity direction. However, as applies to the translational accelerometers mounted on the vehicle or craft, the two parts contain the same frequency components due to the motion of the vehicle or craft. Therefore, the two parts cannot be separated, so that the signals originating from the accelerometers cannot be used for the determination of the tilt angles $\alpha$ and $\beta$. The low-frequency components of the two output signals can, however, be used for obtaining the low-frequency components of the tilt angles $\alpha$ and $\beta$.

For the determination of the high-frequency components of the tilt angles $\alpha$, $\beta$ and $\gamma$, the signals supplied by angular accelerometers can be used. According to the present invention, the vehicle or craft thereto carries three angular accelerometers which are so placed that they supply the angular acceleration components $\dot{\omega}_x$, $\dot{\omega}_y$ and $\dot{\omega}_z$. The following relationships apply for the selected tilt angles $\alpha$, $\beta$ and $\gamma$:

$$\left. \begin{array}{l} \dot{\alpha} = \omega_x - \dot{\gamma} \sin \beta \\ \dot{\beta} + \omega_y \cos \alpha + \omega_z \sin \alpha \\ \dot{\gamma} \cos \beta = -\omega_y \sin \alpha + \omega_z \cos \alpha \end{array} \right\}$$

Since it concerns here only the high-frequency components of the tilt angles $\alpha$, $\beta$ and $\gamma$, the integration constants may be neglected in solving the above equations.

The present invention is therefore based on the fact that the low frequency components of $\alpha$ and $\beta$ can be determined by means of two translational accelerometers, and the high-frequency components of $\alpha$, $\beta$ and $\gamma$ by means of three angular accelerometers, while the low-frequency components of $\gamma$ can be derived from a compass.

It will, however, be clear that specific requirements have to be made on the low or high-pass filters to be used. This will be discussed in more detail hereinafter.

It should be noted that the terms "low frequency" and "high frequency" refer to the motions of the vehicle or craft, respectively below and above a "separation" frequency $\omega_o$, which on the one hand should be selected sufficiently low in order to adequately suppress the signals $a_{ox}$ and $a_{oy}$ but which, on the other hand, cannot be taken too low, as in the latter case the errors in the signals originating from the angular accelerometers may become too great. It is a fact that such errors are not caused by drift, which is completely suppressed after all, but by very slow motions of the vehicle or craft.

It should also be noted that a combination of two translational accelerometers can in principle be used for each angular accelerometer. This possibility will not be further discussed since this is not considered essential for a good understanding of the present invention.

The present invention will now be described in more detail with reference to the figures of which

In the figures like parts are denoted by like reference numerals.

Figure 1:
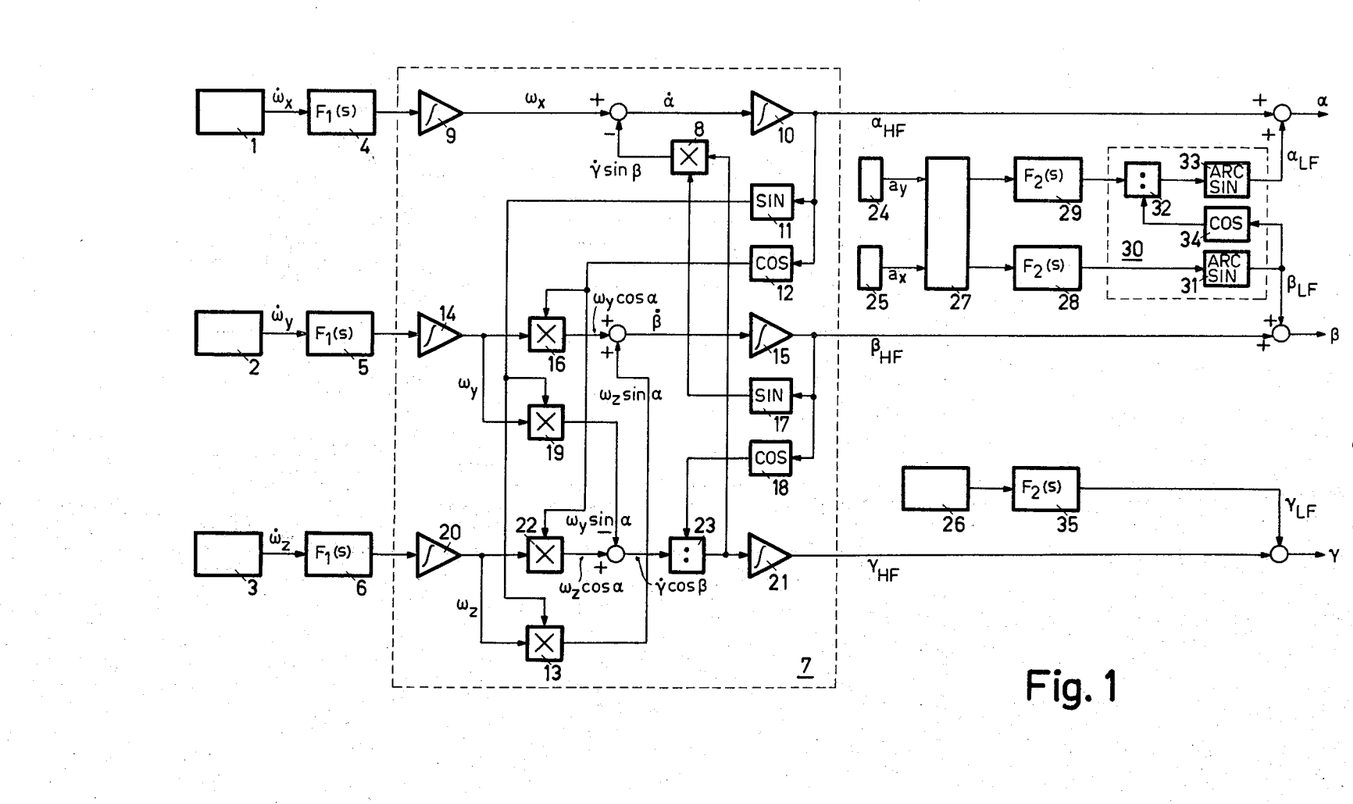
FIG. 1 illustrates schematically the method employed in determining the tilt according to the present invention.

In FIG. 1 the angular accelerometers mounted on a vehicle or craft are indicated by the numerals 1, 2 and 3. The signals supplied by these accelerometers are designated by $\dot{\omega}_x$, $\dot{\omega}_y$ and $\dot{\omega}_z$, respectively. Since from these signals only the high-frequency components of the tilt angles $\alpha$, $\beta$ and $\gamma$ have to be derived, these signals are first filtered. This occurs in the high-pass filters 4, 5 and 6, of which the frequency response can be represented by $F_1(s)$. From the passes high-frequency components of $\dot{\omega}_x$, $\dot{\omega}_y$ and $\dot{\omega}_z$ the high-frequency components of the tilt angles $\alpha$, $\beta$ and $\gamma$ are determined in a (first) computing device 7. Hereto, the following set of equations, defined by the tilt angles, are solved in this device:

$$\left. \begin{array}{l} \dot{\alpha} = \omega_x - \dot{\gamma} \sin \beta \\ \dot{\beta} = \omega_y \cos \alpha + \omega_z \sin \alpha \\ \dot{\gamma} \cos \beta = -\omega_y \sin \alpha + \omega_z \cos \alpha \end{array} \right\}$$

The method employed by the computing device 7 is shown in FIG. 1. The high-frequency components of the tilt angle $\alpha$, indicated by $\alpha_{hf}$, are obtained by integrating the filtered signal $\dot{\omega}_x$ supplied to the computing device 7, subtracting the signal ($\dot{\gamma} \sin \beta$), derived from a multiplier 8, from the integration result $\omega_x$ and by integrating the difference thus obtained. The integrators employed are designated by 9 and 10. From the signal $\alpha_{hf}$ the high-frequency components of $\sin \alpha$ and $\cos \alpha$ are obtained by means of sine and cosine generators 11 and 12. The high-frequency components of the tilt angle $\beta$, designated by $\beta_{hf}$, are obtained by integrating the filtered signal $\dot{\omega}_y$ supplied to the computing device 7, multiplying the integration result $\omega_y$ by $\cos \alpha$, adding the product thus formed to the signal ($\omega_z \sin \alpha$) derived from the multiplier 13 and by integrating this sum. The integrators and multipliers used for this purpose are indicated by 14, 15 and 16. From the signal $\beta_{hf}$ the high-frequency components of $\sin \beta$ and $\cos \beta$ are obtained by means of a sine and a cosine generator 17 and 18. The high-frequency components of the tilt angle $\gamma$, designated by $\gamma_{hf}$, are obtained by integrating the filtered signal $\dot{\omega}_z$ supplied to the computing device 7, multiplying the integration result $\omega_z$ by $\cos \alpha$, subtracting the signal ($\omega_y \sin \alpha$), derived from the multiplier 19, from the product thus obtained, dividing this difference by $\cos \beta$ and by integrating this result. The integrators, multiplier and divider used for this purpose are designated by 20, 21, 22 and 23.

The signal supplied by the multiplier 8 is obtained from the signals $\sin \beta$ and $\dot{\gamma}$ derived from the sine generator 17 and the divider 23, respectively. The signal supplied by the multiplier 13 is obtained from the signals $\omega_z$ and $\sin \alpha$, derived from the integrator 20 and the sine generator 11. Finally, the signal supplied by the multiplier 19 is obtained from the signals $\omega_y$ and $\sin \alpha$, originating from the integrator 14 and the sine generator 11, respectively.

As already stated, the low-frequency components of the tilt angles $\alpha$, $\beta$ and $\gamma$ are derived from two translational accelerometers and a compass. The two translational accelerometers are designated by 24 and 25, the compass by 26. The signals $a_x$ and $a_y$ derived from the translational accelerometers are fed to a second computing device 27. In this device the respective $x$ and $y$ components of that part of the measured acceleration $\vec{a}$ which may be represented by $\dot{\vec{\omega}} \times \vec{r} - \vec{\omega} \times (\vec{\omega} \times \vec{r})$ are eliminated. Hereto, this computing device is supplied with the signals $\dot{\omega}_x$, $\dot{\omega}_y$ and $\dot{\omega}_z$ as well as the signals $\omega_x$, $\omega_y$ and $\omega_z$, determined in the first computing device 7; furthermore, it is assumed that the position vectors of the translational accelerometers are known. The process performed in the computing device 27 will be discussed hereinafter. The signals supplied by the computing device 27 may now be indicated by $a_{ox} + g \sin \beta$ and $a_{oy} + g \sin \alpha \cos \beta$. These terms represent the $x$ and $y$ components of the acceleration $\vec{a}$ if the two translational accelerometers were placed at the centre of gravity of the vehicle or craft. Each of the latter signals is fed to a low-pass filter 28 and 29, respectively, of which the frequency response may be represented by $F_2(s)$. These filters have to suppress the terms i $a_{ox}$ and $a_{oy}$ completely. In the unit 30 the low-frequency components of $\alpha$ and $\beta$, designated by $\alpha_{lf}$ and $\beta_{lf}$, are obtained from the low-frequency components of the remaining terms $g \sin \beta$ and $g \sin \alpha \cos \beta$. Hereto, an arc-sine generator 31 is used, with the aid of which generator the value $\beta_{lf}$ is obtained from the signals supplied by the filter 28; a divider 32, an arc-sine generator 33 and a cosine generator 34 are used to obtain the value $\alpha_{lf}$ from the signal supplied by the filter 29, after dividing by cos $\beta 0$ and after applying the arc-sine operation on the resultant quotient. The low-frequency components of $\gamma$, designated by $\gamma_{lf}$, are derived from the compass 26 directly after filtering in the filter 35. The frequency response of the filter 35 is identical to that of the filters 28 and 29. By combining the resultant signals $\alpha_{lf}$ with $\alpha_{hf}$, $\beta_{lf}$ with $\beta_{hf}$ and $\gamma_{lf}$ with $\gamma_{hf}$, the desired tilt angles $\alpha$, $\beta$ and $\gamma$ are obtained.

Figure 3:
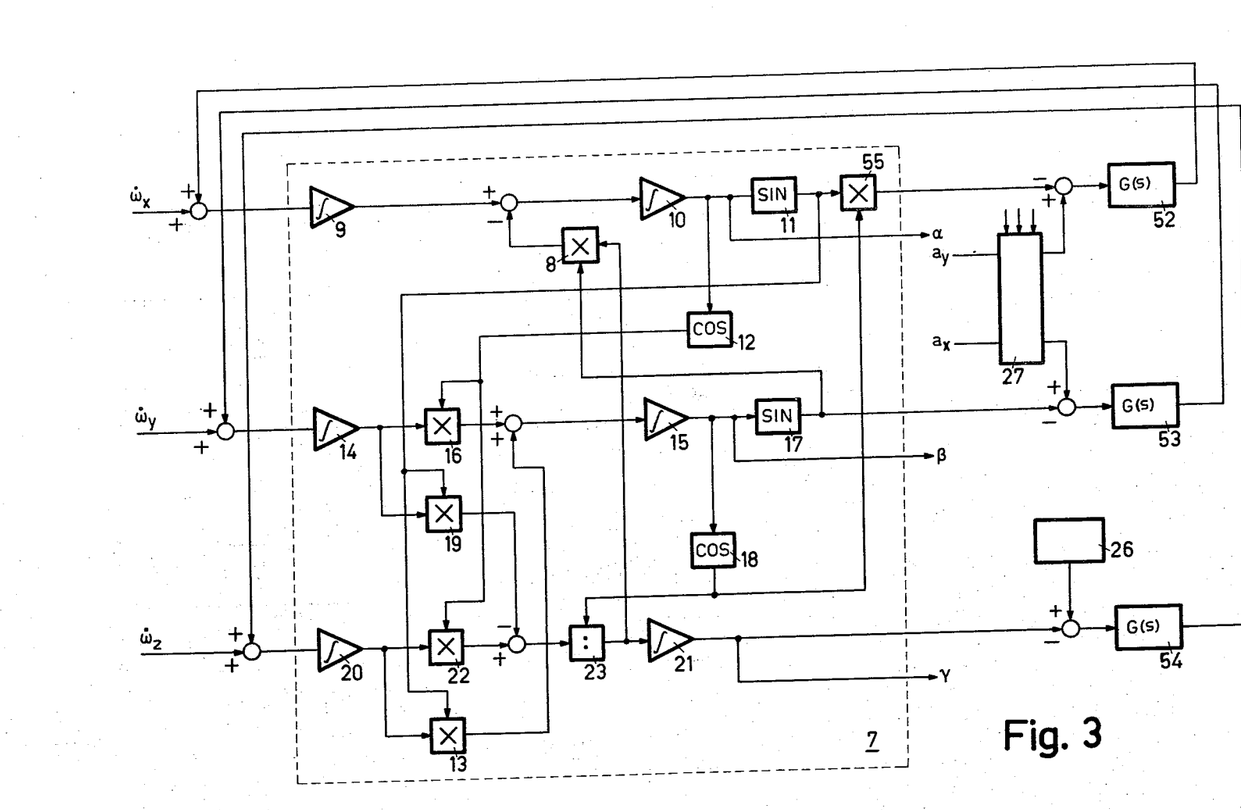
FIG. 3 illustrates in more detail the method of determining the tilt as shown schematically in FIG. 1.

It should be noted once again that the diagram in FIG. 1 is only a working diagram and does not represent an operable apparatus. As the initial conditions of the integrators 9, 14, 20 and 10, 15, 21 are unknown, incorrectly chosen initial conditions, which may be interpreted as steplike disturbances at the inputs of the integrators, may cause the integrators to reach their extreme limits. Therefore, in possible designs the high-pass filter and the two integrators, (4, 9, 10), (5, 14, 15) and (6, 20, 21) respectively, should be integrated in a negative feedback system. An allowance is then made for the initial conditions during the running-in phase of the control system thus realised. Likewise, the integrators forming part of the filters 28, 29 and 35, have to be incorporated in a negative feedback system characterising the filter function. The low or high frequency component supplied per tilt angle by the negative feedback system can again be combined, as shown in FIG. 1. Filter functions realised by two separate control systems carry the disadvantage that it is difficult to satisfy the requirement that $F_1(s) + F_2(s) = 1$; this requirement will be discussed hereinafter. FIG. 3 illustrates an embodiment containing one control system for each tilt angle, which control system is capable to effectuate the functions of $F_1(s)$ and $F_2(s)$.

Having discussed, with reference to FIG. 1, the method to be employed for deriving the tilt angles $\alpha$, $\beta$ and $\gamma$ from the signals supplied by two translational accelerometers, three angular accelerometers and a compass, the requirements to be met by the filters $F_1(s)$ and $F_2(s)$, the methods of selecting these filters and the way in which the second computing device 27 is designed will first be considered before discussing how the employed method can be put into practice.

The filters defined by the characteristics $F_1(s)$ and $F_2(s)$ have to satisfy the following requirements:

1. Since $F_1(s)$ passes high frequencies and $F_2(s)$ low frequencies, the relationship $F_1(s) + F_2(s) = 1$, as applies to low and high frequencies, should also be satisfied in the transition region, so that this requirement can be represented by $F_1(s) + F_2(s) = 1$;

2. In order to eliminate the influence of a d.c. error (drift) in the angular accelerometer signal $(F_1(s)/s^2) \rightarrow 0$ for $s \rightarrow 0$;

3. The filters should be sufficiently stable; for example, the occurrence of natural vibrations during the running-in phase must be avoided;

4. The function of the low-pass filter is to filter out disturbing influences due to the accelerations $a_{ox}$ and $a_{oy}$. To this end, there must be sufficient attenuation above the bandwidth. The slope with which $F_2(s) \rightarrow 0$ must therefore be sufficiently large;

5. Within the scope of the above requirements the order of the filter should be chosen as small as possible to simplify the calculations.

Points 4 and 5 above imply that a compromise must be made. A greater attenuation of $F_2(s)$ above the bandwidth is accompanied with a higher order of the filter.

For $F_1(s)$ and $F_2(s)$ the following frequency responses may be taken:

$$F_1(s) = \frac{1}{(s+\omega_0)^n} \sum_{k=3}^{n} \binom{n}{k} \omega_0^{n-k} s^k$$

$$F_2(s) = \frac{1}{(s+\omega_0)^n} \sum_{k=0}^{2} \binom{n}{k} \omega_0^{n-k} s^k$$

where $n$ is the order of the filters and $\omega_0$ the separation frequency.

The following describes a practical embodiment of the apparatus for determining the tilt. In this embodiment the filters chosen are of the fifth order, so that $$F_1(s) = (s^5 + 5\omega_0 s^4 + 10\omega_0^2 s^3)/(s + \omega_0)^5$$

$$F_2(s) = (10\omega_0^3 s^2 + 5\omega_0^4 s + \omega_0^5)/(s + \omega_0)^5$$

Figure 1A:
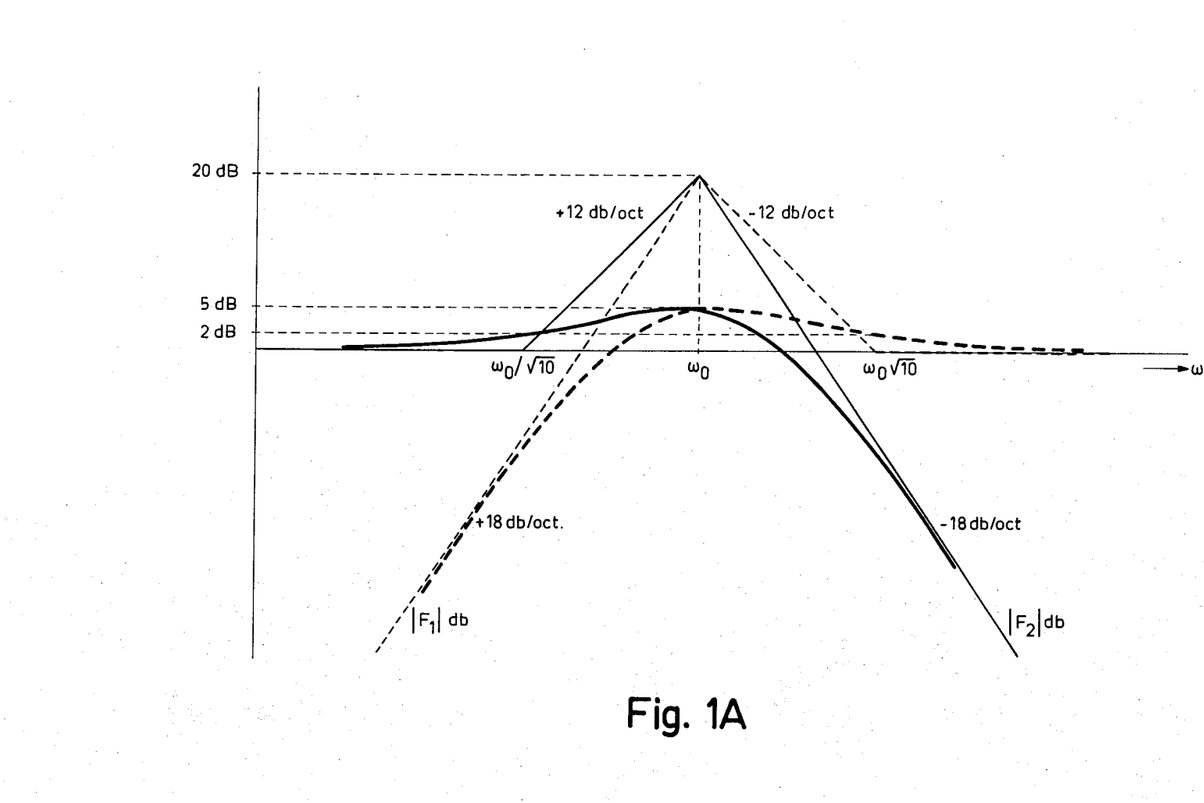
FIG. 1A illustrates a diagram indicating the properties of the low- and high-pass filters employed.

The attenuation of $F_2(s)$ above the bandwidth is here $-18$ dB/oct. It has been found that the filter characteristics thus chosen meet the above requirements very well. FIG. 1A illustrates the frequency responses $|F_1(\omega)|$ and $|F_2(\omega)|$ as well as their asymptotic approach.

Figure 2:
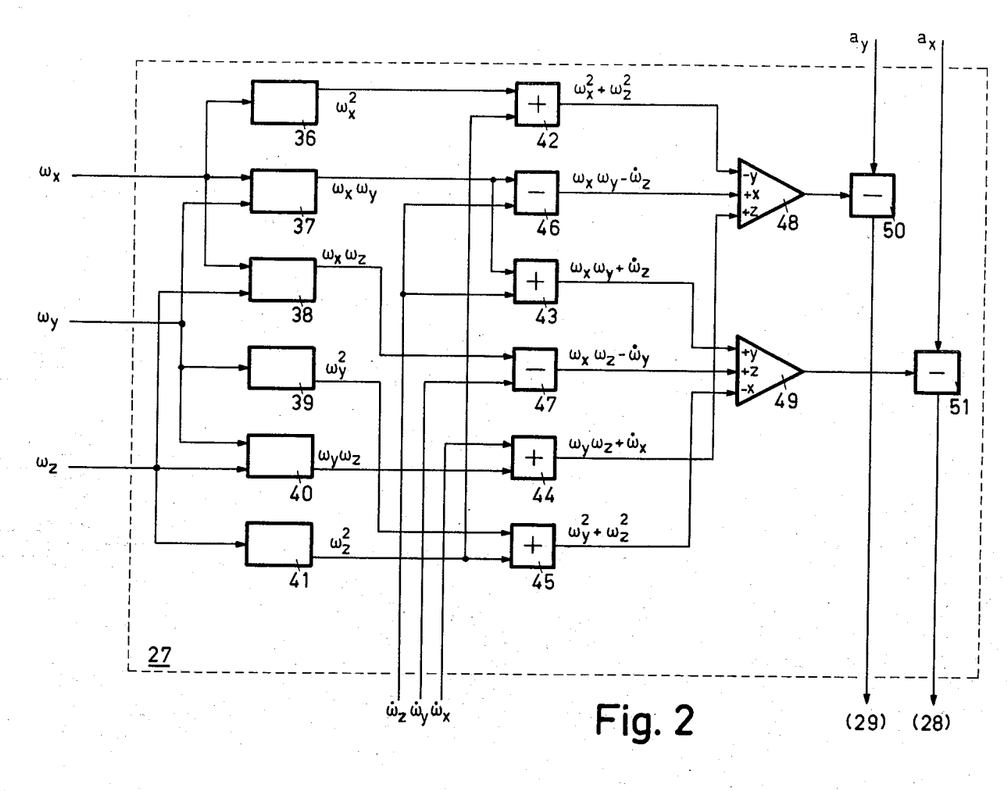
FIG. 2 illustrates a more detailed diagram of the second computing device indicated in FIG. 1.

FIG. 2 shows the process performed in the second computing device 27. By means of six multipliers 36 - 41, four adders 42 - 45 and two subtracters 46 and 47 the signals $\omega_x^2 + \omega_z^2$, $\omega_x \omega_y - \dot{\omega}_z$, $\omega_x \omega_y + \dot{\omega}_z$, $\omega_x \omega_z - \dot{\omega}_y$, $\omega_y \omega_z + \dot{\omega}_x$ and $\omega_y^2 + \omega_z^2$ are formed from the signals $\omega_x$, $\omega_y$ and $\omega_z$ derived from the angular accelerometers and from the signals $\omega_x$, $\omega_y$ and $\omega_z$ generated in the first computing device 7. The correct combination of these signals in the amplifiers 48 and 49, i.e. allowing for the position vectors of the translational accelerometers, produces the signals which, subtracted from the signals $a_x$ and $z_y$ originating from the translational accelerometers, result in the signals $g \sin \beta$ and $g \sin \alpha \cos \beta$; the latter signals are subsequently fed to the low-pass filters 28 and 29. The elimination of the respective components of $\vec{\omega} \times \vec{r} - \vec{\omega} \times (\vec{\omega} \times \vec{r})$ from $a_x$ and $a_y$ occurs in the subtracters 50 and 51.

Figure 4:
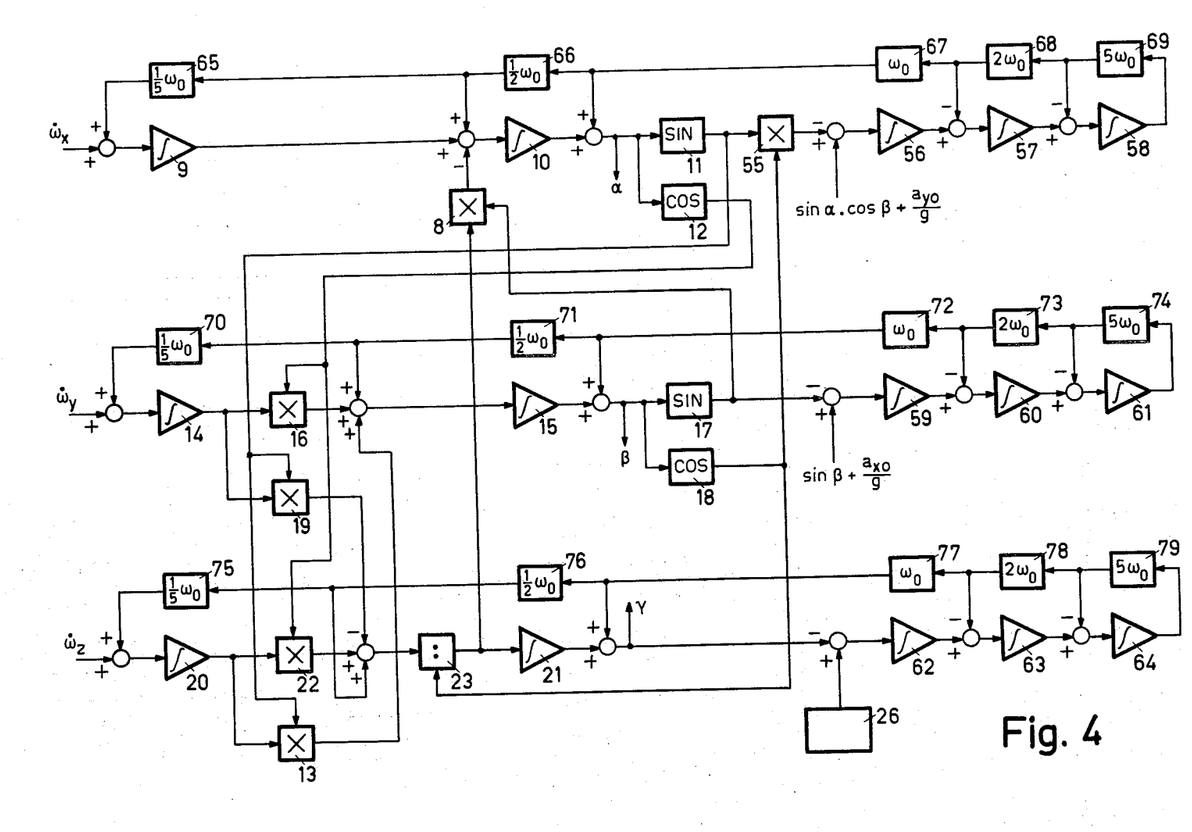
FIG. 4 illustrates a block diagram of a practical embodiment of the apparatus for determining the momentary tilt, according to the invention.

FIG. 3 illustrates a realisation of the method indicated in FIG. 1. Here, the system contains three control circuits, the low and high-pass filters from FIG. 1 have been deleted as separate elements; on the other hand, each of the control circuits contains a filter respectively 52, 53 and 54, of which the frequency response $G(s)$ is related to that of the afore-mentioned low and high-pass filters, the relationship being $$G(s) = s^2 [F_2(s)/F_1(s)];$$

furthermore, the design of the first computing device 7 differs somewhat from the embodiment illustrated in FIG. 1. The differences lie in the fact that the embodiment illustrated in FIG. 3 contains a multiplier 55; also the values $\alpha_{lf}$ and $\beta_{lf}$ are not combined with $\alpha_{hf}$ and $\beta_{hf}$ respectively, but $(\sin \alpha \cos \beta)_{lf}$ is combined with $(\sin \alpha \cos \beta)_{hf}$ and $(\sin \beta)_{lf}$ with $(\sin \beta)_{hf}$. The element 30 shown in FIG. 1 could therefore be omitted. This procedure is not only desirable, but is even necessary for the following reason:

As shown in FIG. 1, filtering takes place first, while $a_{ox}$ and $a_{oy}$ are being suppressed sufficiently, before the computing operations are executed in the unit 30. For example, signal $(g \sin \beta)_{lf} + (g \sin \beta)_{hf} + a_{ox}$ is fed to the filter 28. The value $a_{ox}$ then contains also errors originating from an inaccurately performed elimination of the terms derived from the tangential and centripetal accelerations. The filter passes $(g \sin \beta)_{lf}$ only, and the value $\beta_{lf}$ can be determined from this filter result. If the filter process were to occur after the processing in element 30, i.e. the filter would be supplied with arc sin $[g \sin \beta + a_{ox}]$, the difficulty would arise that, in case the term $a_{ox}$ is so large that $g \sin \beta + a_{ox} > 1$, the arc sin value is indeterminate. Therefore, no arc-sine operation can be performed before the filtering process. In the designs as shown in FIGS. 3 and 4 the filters are incorporated in the respective control circuit. An arcsine operation would therefore be possible only before the filtering. In view of the associated difficulties, the low and high-frequency components of the angular values are not combined, but the respective trigonometric values. The desired tilt angles $\alpha$, $\beta$ and $\gamma$ appear, as will be seen, at the output of the integrators 10, 15 and 21 contained in the control circuits.

With respect to the signals originating from the angular accelerometers the control circuits behave as a high-pass filter; they behave as a low-pass filter with respect to the signals obtained from the computing device 27 and derived from the translational accelerometers and with respect to the signals originating from the compass 26.

Assuming that only a rotation about the $x$ axis occurs, i.e. $\beta$ and $\gamma$ remain zero, and that the rotation is so small that $\sin \alpha$ can be approximated by $\alpha$, the following simplifications may be applied in the respective control circuit in FIG. 3:

The signal $\dot{\gamma} \sin \beta$, originating from the multiplier 8, equals 0.

The sine generator 11 connected to the integrator 10 may be left out of consideration.

The signal $\cos \beta$, originating from the cosine generator 18 and applied to the multiplier 55, equals 1.

Considering the above assumptions, the following relationship can be applied to the respective control circuit:

$$L\{U\} = \frac{1}{1 + \frac{G(s)}{s^2}} \left[ \frac{L\{\dot{\omega}_x\} + G(s) \cdot L\left\{\frac{a_{oy}}{g} + \alpha\right\}}{s^2} \right]$$

where $L\{U\}$ is the Laplace transformation of the output signal U of the integrator 10, $L \omega_x$ the Laplace transformation of signal $\omega_x$ originating from the angular accelerometer, and $L\{(a_{oy}/g) + \alpha\}$ the Laplace transformation of the signal derived from the translational accelerometer 24 with the aid of the computing device 27. For the signal obtained with the aid of the computing device 27 can be represented by $a_{oy} + [A\vec{g_v}] = a_{oy} + g \sin \alpha \cos \beta$ or, taking into account the above assumptions, $a_{oy} + g \alpha$. The computing device 27 is now so designed that the signals delivered can be standardised to the value $g$, so that the supplied signal becomes $(a_{oy}/g) + \alpha$. By the selection of the filter $G(s) = s^2 [F_2(s)/F_1(s)]$, the relationship applying to the control circuit may be written as $$L\{U\} = F_1(s) \cdot (L\{\dot{\omega}_x\}/s^2) + F_2(s) \cdot L\{(a_{oy}/g) + \alpha\}.$$

From this it is seen that the signal $\dot{\omega}_x$ originating from the angular accelerometer 1 is filtered with the aid of a filter integrated in the control circuit, of which filter the frequency response corresponds with the high-pass filter 4 in FIG. 1, and the signal originating from the translational accelerometer 24 and obtained from the computing device 27 is filtered with the aid of a filter integrated in the same control circuit, of which filter the frequency response corresponds with the low-pass filter 28 in FIG. 1.

Since $L\{\dot{\omega}_x\}/s^2 = L\{\alpha\}$, the above-mentioned relationship can be reduced to $$L\{U\} = [F_1(s) + F_2(s)] \cdot L\{\alpha\} + F_2(s) \cdot L\{a_{oy}/g\}.$$

Furthermore, the frequency responses $F_1(s)$ and $F_2(s)$ were so selected that $F_1(s) + F_2(s) = 1$ and the function of the filter $F_2(s)$ was to filter out the disturbing influences of $a_{oy}$, so that $U = \alpha$. The integrator 10 therefore supplies the correct tilt angle $\alpha$. Although the latter is demonstrated only under the above-mentioned assumptions, the above description also applies without these assumptions. Similarly, the integrators 15 and 21 provide the tilt angles $\beta$ and $\gamma$.

The selection of $F_1(s)$ and $F_2(s)$ and hence the selection of $G(s)$ permits a simple elaboration of the apparatus for the determination of the momentary tilt in accordance with the invention. This practical embodiment is shown in FIG. 4 and differs from the diagram shown in FIG. 3 in that respect that the filters 52, 53 and 54 are realised in a simple way, the transfer characteristic of the filters being represented by $$G(s) = s^2 [F_2(s)/F_1(s)] = [\omega_o^3 (10 s^2 + 5\omega_o s + \omega_o^2)]/[s(s^2 + 5\omega_o s + 10\omega_o^2)].$$

Filters incorporated in each of the control circuits contain respectively the integrators 56 – 58, 59 – 61 and 62 – 64, and the amplifiers 65 – 69, 70 – 74 and 75 – 79, which are provided with a negative feed-back loop in each of the control systems as shown in the figures. An embodiment of the filters 52, 53 and 54, as shown in FIG. 3, carries the disadvantage that incorrect initial conditions of the integrators, also those forming part of said filters, impair the stability. Hence, a filter selection embodying a negative feedback to each of the integrators will enhance the stability.

What we claim is:

1. An apparatus for determining the momentary tilt of a mobile vehicle, comprising: three angular accelerometers secured to the vehicle in three coordinate axes to produce first output signals determining the angular acceleration components with respect to the center of gravity of the vehicle; high pass filter means and a first computing device connected to said angular accelerometers to derive from said first output signals high-frequency components containing information about the tilt angles; two translational accelerometers secured to the vehicle in a substantially horizontal plane to produce second output signals determining acceleration components in two, mutually perpendicular, axial directions; compass means adapted for producing an additional output signal determining the azimuth of the vehicle; a second computing device and low-pass filter means connected to said translational accelerometers and to said compass means to derive from said second and additional output signals low-frequency components containing information about the tilt angles; and means for combining said low and high frequency components into signals analoguous to the tilt angles.

2. Apparatus as claimed in claim 1, wherein said second computing device eliminates from the second output signals the components originating from the tangential and centripetal accelerations experienced by the vehicle.

3. Apparatus as claimed in claim 2 wherein the low-pass filter means is so dimensioned that the translational acceleration components supplied by the second computing device are suppressed.

4. Apparatus as claimed in claim 3, whereby the transfer function of the high-pass filter is represented by $F_1(s)$ and that of the low-pass filter by $F_2(s)$, wherein $F_1(s) + F_2(s) = 1$ and each of the output signals of the first computing device, combined with the corresponding signal delivered by the second computing device and the compass means, is fed to a filter of which the transfer function is represented by $$G(s) = s^2 \cdot [F_2(s)/F_1(s)],$$

and of which filter the output signal is added to the signal supplied by the respective angular accelerometer via a negative feedback loop, such that the control circuits thus realised function as low-pass filter for the signals delivered by the second computing device and the compass and as high-pass filter for the signals supplied by the angular accelerometers.

5. Apparatus as claimed in claim 4, wherein the transfer functions $F_1(s)$ and $F_2(s)$ satisfy the relationships:

$$F_1(s) = \frac{1}{(s+\omega_o)^n} \sum_{k=3}^{n} \binom{n}{k} \omega_o^{n-k} s^k$$

and $$F_2(s) = \frac{1}{(s+\omega_o)^n} \sum_{k=0}^{2} \binom{n}{k} \omega_o^{n-k} s^k$$

where $n$ represents the order of the filters and $\omega_o$ the separation frequency.

* * * * *